United States Patent
Thrane

(10) Patent No.: US 7,149,969 B1
(45) Date of Patent: Dec. 12, 2006

(54) METHOD AND APPARATUS FOR CONTENT TRANSFORMATION FOR RENDERING DATA INTO A PRESENTATION FORMAT

(75) Inventor: Leon Thrane, Woburn, MA (US)

(73) Assignee: Nokia Corporation, Espoo (FI)

( * ) Notice: Subject to any disclaimer, the term of this patent is extended or adjusted under 35 U.S.C. 154(b) by 1204 days.

(21) Appl. No.: 09/691,775

(22) Filed: Oct. 18, 2000

(51) Int. Cl.
*G06F 15/00* (2006.01)

(52) U.S. Cl. ............... 715/523; 715/511; 715/513; 715/515; 715/516; 715/517

(58) Field of Classification Search ............ 715/501.1, 715/511, 513, 515, 516, 517, 523; 707/10; 709/203, 231, 246, 247
See application file for complete search history.

(56) References Cited

U.S. PATENT DOCUMENTS

| | | | |
|---|---|---|---|
| 6,430,624 B1 * | 8/2002 | Jamtgaard et al. | 709/246 |
| 6,463,440 B1 * | 10/2002 | Hind et al. | 715/513 |
| 6,507,857 B1 * | 1/2003 | Yalcinalp | 715/513 |
| 6,535,896 B1 * | 3/2003 | Britton et al. | 715/523 |
| 6,585,778 B1 * | 7/2003 | Hind et al. | 715/513 |
| 6,589,291 B1 * | 7/2003 | Boag et al. | 715/513 |
| 6,616,700 B1 * | 9/2003 | Thum et al. | 715/500.1 |
| 2002/0049749 A1 * | 4/2002 | Helgeson et al. | 707/3 |

* cited by examiner

*Primary Examiner*—William Bashore
*Assistant Examiner*—Chau Nguyen
(74) *Attorney, Agent, or Firm*—Harrington & Smith, LLP

(57) ABSTRACT

The present invention encompasses a method in a client-server communication system wherein the method comprises one or more stages for content transformation, which renders data into presentation format. The method comprises at least stage for content transformation that is based on device used by the client.

23 Claims, 3 Drawing Sheets

METHOD AND APPARATUS FOR CONTENT TRANSFORMATION FOR RENDERING DATA INTO A PRESENTATION FORMAT

FIELD OF INVENTION

The present invention relates to information transformation in a computer system, more particularly, to a system for a content transformation for rendering data into a presentation format.

BACKGROUND OF THE INVENTION

The Internet is operable to communicate content, such data or data document, between clients and servers. The client, via the Internet, accesses the content from one or more servers (for example a web server). There are two kinds of content that may be accessed, static content and dynamic content. Static content generally does not change once it is written. The static content can only be replaced. For example, the content presenting daily news stories can only changes when replaced by other news stories. When the client requests a news story, the web server returns a response, for example, a hypertext markup language (html) page or a deck, containing the requested news story. Dynamic content generally contains fields presenting data which change based upon request. For example, a telephone lookup service, wherein, the client requests a telephone number from the server, the server returns an html page containing the phone number.

The Internet started as a large collection of static content, wherein, the content was provided by organizations publishing information for clients to access. Today static content continues to represent the vast majority of the content available on the Internet.

As the science of the Internet has evolved over the past several years, so has the demand for dynamic content, which provides personalization. Today, there is an increase in the number of servers (or sites) that provide dynamic content. The traditional Internet applications providing dynamic content generally deal with providing content for a particular client on a device such as a standard computer. Traditionally, the authors of dynamic content providers have been concerned with only two clients, Netscape Navigator™ and Explorer™ by Microsoft. Typically, the content is created statically and unique to each client, thereby creating two copies of the content stored on the server. This poses a problem, especially as the Internet evolved into a wireless communication system having n-number of clients and n-number of devices. Furthermore, each device may have n-number hardware restrictions. Using the traditional approach, the authors (or the developers) of the content would have to create n×n×n number of copies of each content. Managing the dynamic content using the traditional approach is time consuming and provides a slower response to the clients. The authors, therefore, have limited themselves to providing content for common platforms, thereby limiting personalization to certain clients and clients on non-standard devices.

It would be useful to have a system that allows the authors to create dynamic content independent of client, and that renders data into a presentation format through several stages and personalizes the content based on the client's device, browser type, and user preferences of the client.

SUMMARY OF INVENTION

The present invention advantageously provides a system and an associated method for an n-pass transformation for automatically rendering data into a presentation format based on the client device, browser type, mark-up language employed, or other user preferences.

The present invention encompasses a server, such as a general-purpose computer, in a communication system. The server may be connected to one or more electronic devices representing clients. The invention comprises a method of receiving a request for content from a client and providing the requested content presentable on the client's device. The content is transformed using an n-stage transformation technique, wherein the presentation format is created in one or more stages (passes). In this technique the initial data content is retrieved from the database and then this content is enhanced automatically based on terminal specifics, browser type, mark-up language employed, spoken language (such as Finnish), user preferences, etc.

A more complete appreciation of all the advantages and scope of the present invention can be obtained from the accompanying drawings, the following detailed description of the invention, and the appended claims.

DETAIL DESCRIPTION OF THE INVENTION

Figure 1:
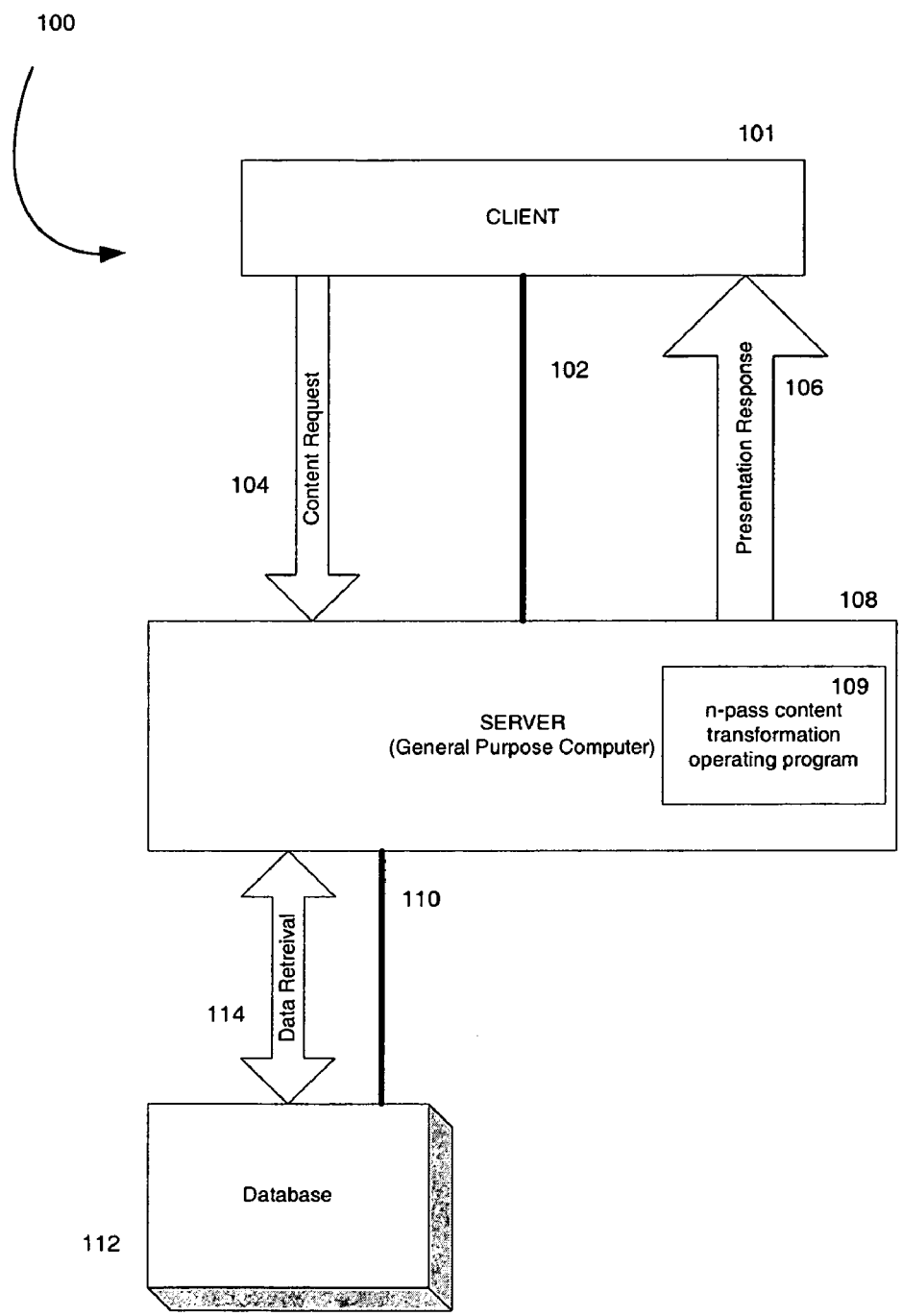
FIG. 1 illustrates a client-server communication system.

FIG. 1 is a client-server communication system according to an embodiment of the invention, shown generally as 100, that provides for search request by a user of a client device. The communication system 100 generally includes a client 101, a server 108 and a database 112.

In an exemplary implementation of the client-server communication system 100 the client 101 is typically connected to the server 108 via client-sever link 102. The client-server link 102 may comprise a wireless link or an electronic link, such as telephone connection. The client 101 comprises a software program, such as a browser, to allow the user to create and send a content request 104. The client 101 may be a mobile terminal, general-purpose computer, a Personal Digital Assistant (PDA) or other client terminal device having the browser. The server 108 may be a general-purpose computer having a memory and processor. The server 108 may be connected to one or more clients analogous to client 101. The sever 108 comprises plurality of operating programs which receive user's search request, such as the content request 104. The server 108 further comprises multi-stage content transformation operating program 109 for carrying out an embodiment of the invention. The server 108 is typically connected to the database 112 via a server-database link 110 for retrieving data based on the content request 104 wherein the server-database link 110 may be a wireless or an electronic link. The database 112 may be a general-purpose computer having various memories. It should be noted that methods of retrieving data from the database are well known in the art and will not be discussed in detail herein. It should be also be noted that the multi-stage content transformation operating program 109 may reside at another general purpose computer (not shown), referred to as gateway, which may be coupled the server 108 and client 101 without departing from the invention.

The client using the browser, creates a content request 104 and requests the sever 108, via the client-server link 104, to provide content. The request reaches the server 108 running a multi-stage content transformation (MPCT) operating program 109. The data is retrieved from the database 112 and a presentation response 106 is created and sent to the client 101. However, further processing is performed on the data retrieved 114 from the database 112 by the MPCT operating program 109 to create the presentation response 106 and is sent to the client 101. The presentation response 106 is the final/actual content to be displayed on the client's terminal and may be a Hypertext Markup Language (HTML), Handheld Device Markup Language (HDML), Wireless Markup Language (WML) or other known Markup languages used to display the presentation response 106 on electronic devices.

Figure 2:
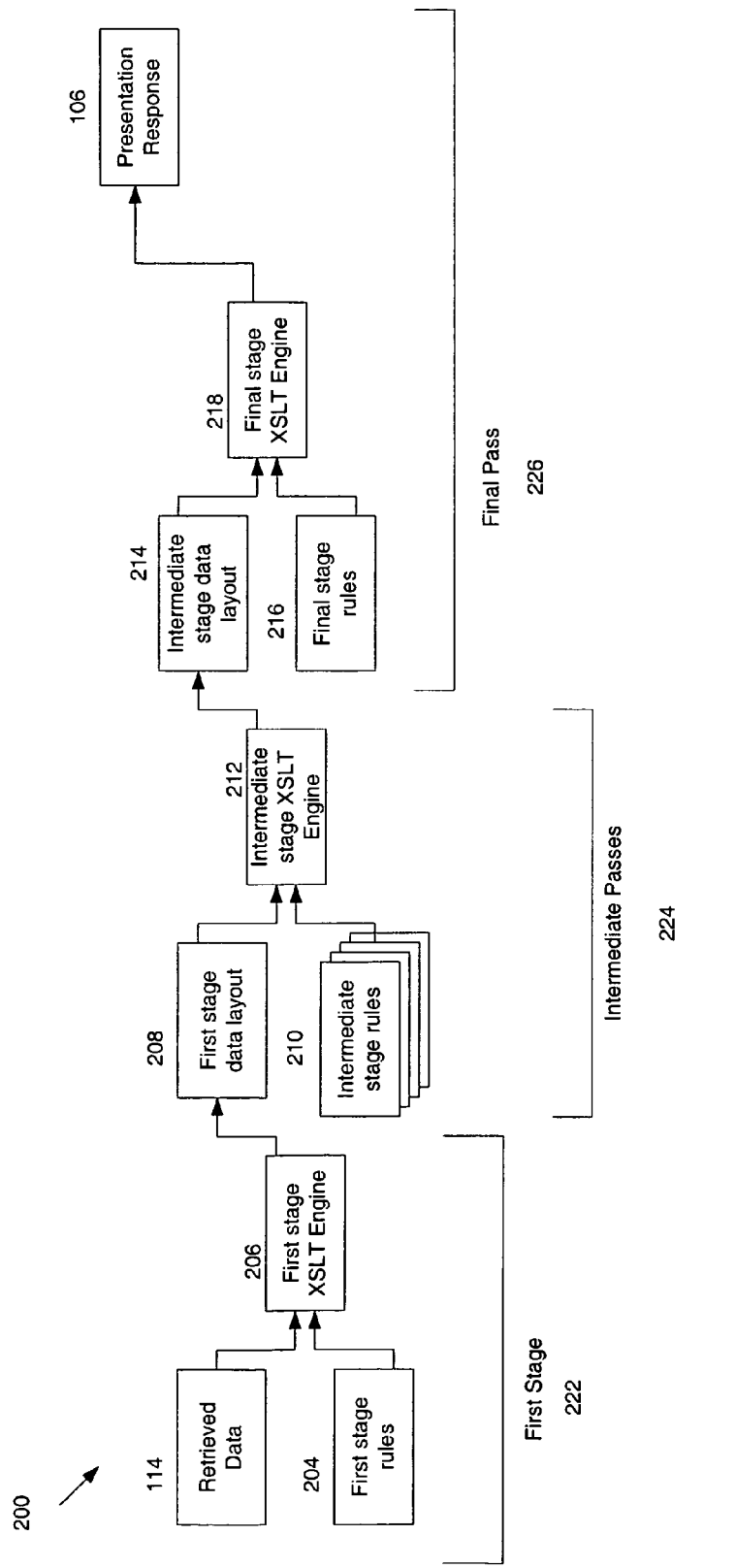
FIG. 2 illustrates a content transformation process depiction of an embodiment of the invention.

FIG. 2 illustrates a preferred embodiment of a multi-stage content transformation process 200. The content is transformed in three stages, a first stage content transformation 222, an intermediate stage content transformation 224 and a final stage content transformation 226. Each stage comprises one or more stage rules (also known as formatting template or stylesheet) defining the layout of a Meta Markup Language (MML) document wherein data is embedded according to rules. In the preferred embodiment, a generic Extensive Stylesheet Language Transformation (XSLT) engine is used to merge (transform) data according to the rules in each stage.

In the first stage 222 the data is retrieved from the database 112. A set of first stage rules 204 are used to merge the retrieved data 114 into a first stage data layout 208 according to the first stage rules 204. The first stage rules 204 are generally defined by using the content request 104. The rules will define how the data is laid out, for example when a telephone number is requested, the actual telephone number will be inserted next to the text presenting the requested telephone. The first stage data layout 208 is a generic layout wherein the retrieved data is inserted according to the first stage rules 204 using a first XSLT engine 206.

The intermediate stage 224 comprises one or more sub-stages that are executed using one or more intermediate rules to further transform first stage data layout 208 to intermediate stage data layout 214. An Intermediate XSLT engine 212, analogous to the first XSLT engine 206, is used to merge first stage data layout 208 and intermediate stage rules 210 for generating the intermediate stage data layout 214. Each rule is merged separately in content transformation sub-stages. When all the rules are merged (or all the sub-stages are executed), the intermediate stage data layout is created. In the preferred embodiment the intermediate stage comprises a browser-type sub-stage using a set of browser-type rules, an internationalization stage using a set of internationalization rules, a user profile stage using a set of user profile rules, and a optimization stage using optimization rules. It should be noted that the number of rules and the type of rules are dependent on the operator of the server. Furthermore, the additional set of rules may be added to the intermediate stage rules or set rules may be deleted from the preferred embodiment without departing from the invention. The set of browser-type rules is used to render data based on the type of browser used by the client 101, such as Netscape™ or Explorer™. The set of internationalization rules are used to create a new MML, wherein, the presentation response 106 may be in a specific language used by the client 101. These rules are used to convert the data into specific language requested by the user of the client 101. The set of user profile rules may be based on the preference of the client's user: such as font, color, graphics, etc. The set of optimization rules is used to optimize, to compress or to encrypt the presentation response 106. Generic transformation languages may used to define these rules and how the rules are defined is not a limitation of this invention.

The final stage 226 comprises a set of final stage rules 216 used for transforming intermediate data layout 214 into a presentation format 106. A final XSLT engine 218, analogous to first and intermediate XSLT engines 206 and 212, is used to merge intermediate stage data layout 214 and final stage rules 216 to form the presentation response 106. The presentation response 106 may be HTML, HDML or any other language understood by the client 101. In the preferred embodiment, the final stage rules 216 are dynamically generated by the server 108 based type of device as defined the client 101. The content request 104 provides information about the client's device 101, such as the model and make of a mobile phone or the type of PDA. For example if a mobile phone is the client 101, then model number of the phone is provided in the content request. The limitations and template rules for particular mobile phones may be predefined and stored in memory of the server 108 for quicker access. The content request 104 may also provide any limitations of devices such as display size, graphics capabilities, memory limitations, etc. The information about the client's device that is provided in the content request 104, is used to dynamically define the final stage rules 216. Once the final stage rules are defined, the intermediate stage data layout is merged to create the presentation response 106, which is then sent the client 101.

Figure 3:
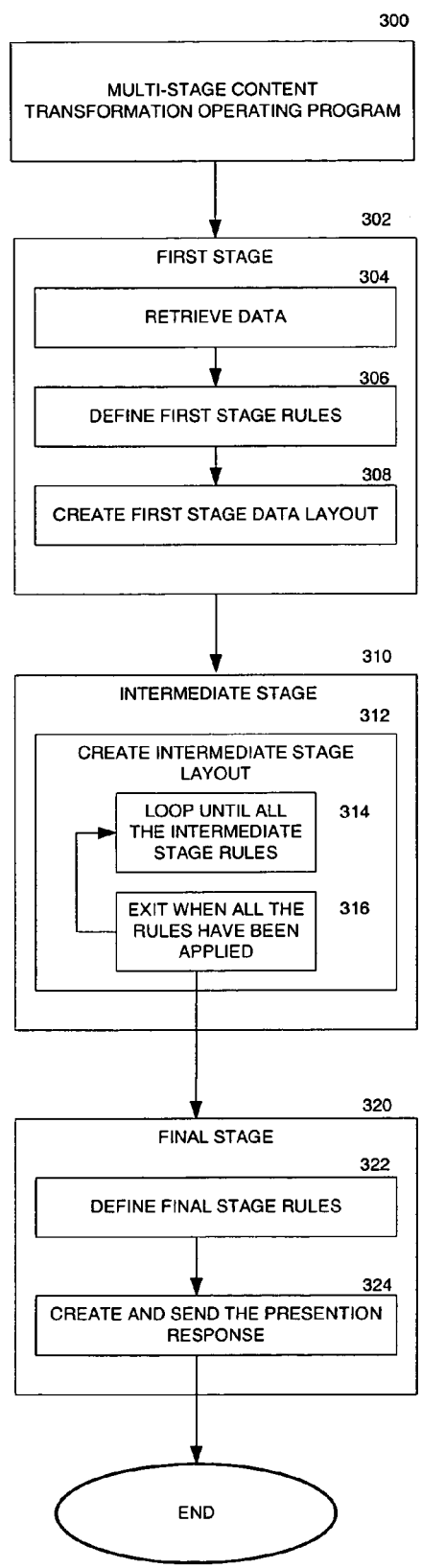
FIG. 3 shows flow diagram of the content transformation operating program according to an embodiment of the invention.

FIG. 3 describes a flow diagram of the multi-stage content transformation operating program 109 according to an embodiment of the invention. In a preferred embodiment, the multi-stage content transformation operating program 109 is stored and operated by the server 108. At block 300, the process 109 is initiated upon receiving a content request 104. At block 302, the first stage of the multi-stage content transformation process 200 is executed. At block 304, the data is retrieved from the database 112. At block 306, the first stage rules is defined in accordance to the content request 104. At block 308, the first stage data layout is created by transforming the retrieved data and the first stage rules.

At block 310, the intermediate stage of the multi-stage content transformation process 200 is executed. At block 312, the intermediate data layout is created by using all the intermediate stage rules that are defined by the operator. In the preferred embodiment, a loop is used to cycle through all the intermediate stage rules, block 314 and 316. Each rule is successively merged with the first stage data layout to form the intermediate stage data layout.

At block 320, the final stage of the multi-stage content transformation process 200 is executed. At block 322, the final stage rules are generated using the content request 104. At block 324, the final stage rules are merged with the intermediate stage data layout to form a presentation response 106 which is returned to the client 101.

As examples, the method may also be implemented by incorporating the first stage content transformation and intermediate content transformation into is the final content transformation whereby a single stage may be used to provide the presentation response. Furthermore, the method may also be implemented in electronic devices such as PDA, general-purpose computers, mobile phones and other devices having processor and memory. The method and apparatus may be realized by using general computer languages or device specific languages.

Thus, while the invention has been particularly shown and described with respect to preferred embodiments thereof, the above description is intended by way of example only and is not intended to limit the present invention in any way except as set forth in the following claims.

What is claimed is:

1. A content transformation method operated in a client-server communication system, the method comprising:
   receiving a content request by a server from a client;
   performing a first stage content transformation to generate a first stage data layout based upon said content request;
   performing an intermediate stage content transformation using said first stage data layout to generate an intermediate data layout; and
   performing a final stage content transformation using said intermediate data layout to generate a presentation format based on a device used by said client.

2. The method as recited in claim 1, wherein performing a first stage content transformation comprises retrieving data from a database.

3. The method as recited in claim 2, wherein performing a first stage content transformation further comprises defining a set of first stage rules.

4. The method as recited in claim 3, wherein performing a first stage content transformation further comprises generating said first stage data layout by transforming said data using said first stage rules.

5. The method as recited in claim 2, wherein performing an intermediate stage content transformation comprises performing at least one sub-stage to generate said intermediate stage data layout.

6. The method as recited in claim 5, wherein performing said at least one sub-stage comprises performing a browser-type stage using a set of browser-type rules.

7. The method as recited in claim 5, wherein performing said at least one sub-stage comprises performing an internationalization stage using a set of internationalization rules.

8. The method as recited in claim 5, wherein performing said at least one sub-stage comprises performing a user profile stage using a set of user profile rules.

9. The method as recited in claim 5, wherein performing said at least one sub-stage comprises performing an optimization stage using a set of optimization rules.

10. The method as recited in claim 1, wherein performing a final stage content transformation comprises defining a set of final stage rules.

11. The method as recited in claim 10, wherein defining a set of final stage rules comprises using said content request to define the final stage rules.

12. The method as recited in claim 1, wherein the content transformation is XSLT based content transformation using an XSLT engine.

13. A server in a client-server communication system, the server comprising;
   a content transformation operating program to perform operations that comprise:
   receiving a content request from a client;
   performing a first stage content transformation to generate a first stage data layout based upon said content request;
   performing an intermediate stage content transformation using said first stage data layout to generate an intermediate data layout; and
   performing a final stage content transformation using said intermediate data layout to generate a presentation format based on a device used by said client.

14. The server according to claim 13, wherein performing a first stage content transformation, further comprises retrieving data from a database.

15. The server according to claim 14, wherein performing a first stage content transformation, further comprises defining a set of first stage rules.

16. The server according to claim 15, wherein performing a first stage content transformation further comprises generating said first stage data layout by transforming said data using said first stage rules.

17. The server according to claim 13, wherein performing an intermediate stage content transformation comprises performing at least one sub-stage to generate said intermediate stage data layout.

18. The server according to claim 17, wherein performing said at least one sub-stage comprises performing a browser-type stage using a set of browser-type rules.

19. The server according to claim 17, wherein performing said at least one sub-stage comprises performing an internationalization stage using a set of internationalization rules.

20. The server according to claim 17, wherein performing said at least one sub-stage comprises performing a user profile stage using a set of user profile rules.

21. The server according to claim 17, wherein performing said at least one sub-stage comprises performing an optimization stage using a set of optimization rules.

22. The server according to claim 13, wherein performing a final stage content transformation comprises defining a set of final stage rules.

23. The server according to claim 22, wherein defining a set of final stage rules comprises using said content request to define the final stage rules.

* * * * *